Figure 2:
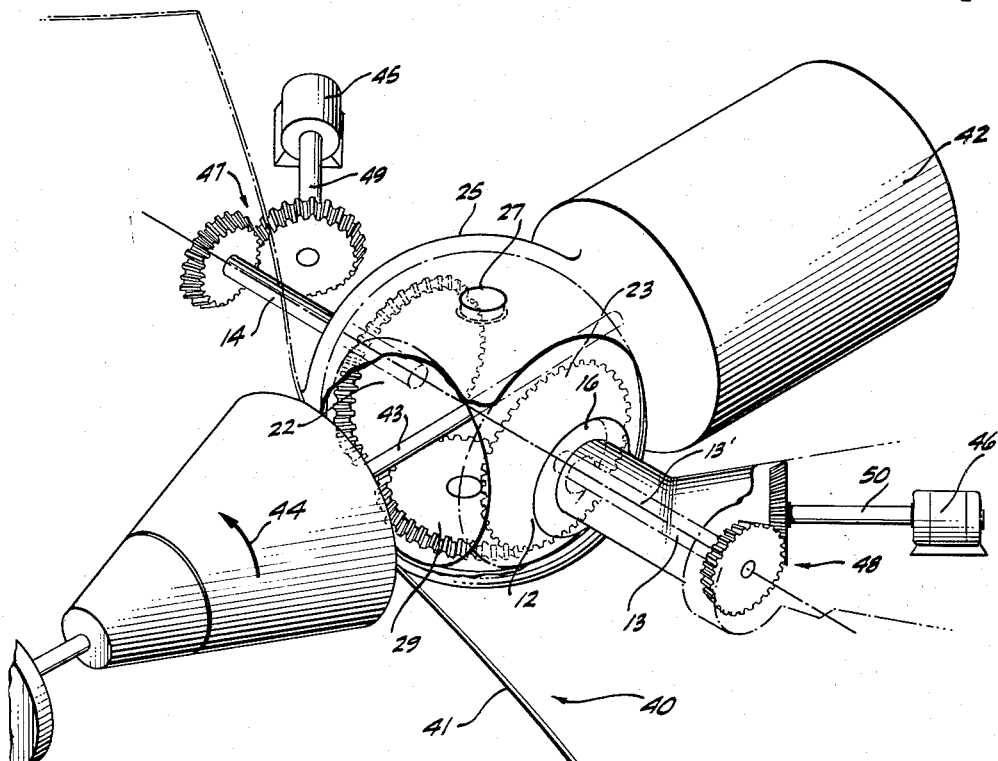

July 18, 1961

H. A. LASSEN 2,992,563

SYSTEM FOR POSITIONING GIMBALED OBJECT

Filed Sept. 17, 1957

2 Sheets-Sheet 1

INVENTOR,
HERBERT A. LASSEN,
BY Gordon R. Sanborn

AGENT.

July 18, 1961

H. A. LASSEN 2,992,563

SYSTEM FOR POSITIONING GIMBALED OBJECT

Filed Sept. 17, 1957

2 Sheets-Sheet 2

INVENTOR,
HERBERT A. LASSEN
BY
Gordon R. Sanborn
AGENT 2,992,563
Patented July 18, 1961

2,992,563
SYSTEM FOR POSITIONING GIMBALED OBJECT
Herbert A. Lassen, Los Angeles, Calif., assignor to Hughes Aircraft Company, Culver City, Calif., a corporation of Delaware
Filed Sept. 17, 1957, Ser. No. 684,614
11 Claims. (Cl. 74—5.47)

The present invention relates generally to a system for applying torque to a gimbal system, and more particularly to a torquing system for positioning the inner gimbal of a two degree of freedom gimbal structure.

A gimbal structure may be used to provide two degress of freedom for a given object such as in conjunction with the mounting of guns or gyroscopes. In such uses, the object which is to have two degrees of freedom is generally mounted upon an inner gimbal frame, or ring, which is rotatably supported by an outer frame through the use of a first set of trunnions or supporting shafts. The outer frame is in turn supported by a second set of trunnions which are orthogonal to the first set. In such systems, means must be provided for positioning the inner gimbal frame and the object mounted thereon. In addition, if the object mounted upon the inner gimbal frames is a gyroscopic mass, means must be provided for applying the precessional torque or force at right angles to the desired direction of precession.

Prior art systems for positioning the inner gimbal frame with respect to the supporting members for the outer trunnions generally have the torquing device mounted upon the inner gimbal frame and adapted to provide the necessary torque to cause rotation of the inner gimbal frame with respect to the outer gimbal frame. Such prior art systems of course increase the complexity of the structure and inherently have a disadvantage if the dynamic balance of the system is of importance. Another method of precessing or positioning the inner gimbal frame of a two degree of freedom gimbal system is to use a plurality of push rods coupled with the gimbal frames for applying the required torque. Such systems however in general limit the angular movement of the inner gimbal frame.

It is therefore an object of the present invention to provide an improved system for applying torques to, or of positioning, the inner gimbal frame of a two degree of freedom gimbal structure.

Another object of the present invention is to provide an improved system for precessing a gyroscopic mass mounted upon a two degree of freedom gimbal frame.

A further object of the present invention is to provide an improved system for increasing the angular movement of a gimbal mounted gyroscopic mass.

In accordance with the present invention, the inner gimbal of a two degree of freedom gimbal structure is adapted to support a gyroscopic mass or any other object which may be desired to be mounted in a manner such that it will have at least two degrees of freedom. The inner gimbal frame is supported by an outer gimbal frame by means of a first set of trunnions, with the inner gimbal frame adapted to rotate about the axis of the first set of trunnions. The outer gimbal frame is supported by a second set of supporting shafts or trunnions which are orthogonal to the first set and adapted to permit rotation of the outer gimbal frame about the axis of the second set of trunnions.

In one embodiment of the present invention two rotary input shafts for applying the required torque lie along the supporting axis of the outer gimbal frame and are adapted to rotate independently of the outer gimbal frame. The two rotary input shafts may also serve as the outer trunnions and are coupled with the inner gimbal frame by means of a differential driving arrangement. This driving arrangement is adapted to change the angle of the inner gimbal frame with respect to the inner trunnions, which will be called the azimuth angle, by the application of torque to the rotary input shafts in a manner such that the torque applied to one shaft is different in magnitude or direction from the torque applied to the other shaft. The angle changed by rotation of the inner gimbal frame about the outer trunnions will be called the elevation angle, and is changed by the application of torque of the same magnitude and in the same direction to each of the input shafts.

The differential arrangement itself may take any of a number of forms, including a friction, magnetic, or mechanical differential. One preferred system utilizes beveled gears and includes a first and a second driving gear attached respectively to the driving shafts and lying within the outer gimbal frame. A third beveled gear or spider gear is rigidly attached to the inner gimbal frame and adapted to engage the first and second beveled gears. Thus, when there is a difference between the torque applied to the two rotary inputs, there is relative motion between the driving gears and the spider gear. This changes the azimuth angle of the inner gimbal frame. When there is no difference between the torque applied to the first and second driving shafts, there is no relative movement between the driving gears and the spider gear. Thus the ring gear, the inner gimbal frame which is attached thereto, and the outer gimbal frame are rotated about the outer trunnions, changing the elevation angle of the inner gimbal frame.

In another embodiment of the present invention a plurality of flexible force transmitting members such as cables or similar devices are so coupled with the inner and outer gimbal frames that when the stress or force applied to a first pair of cables is of equal magnitude and in the same direction the elevation angle is changed and when a difference in the force applied to the two cables is of unequal magnitude the azimuth angle is changed. In this embodiment two sets of pulleys are mounted upon the outer trunnions and serve to support the flexible force transmitting members.

Utilizing torque-sensitive driving members, the torquing system of the present invention inherently provides a method of precessing a gyroscopic mass mounted upon the inner gimbal frame, with the direction of precession being displaced 90 degrees from the direction of the applied force.

Figure 3:
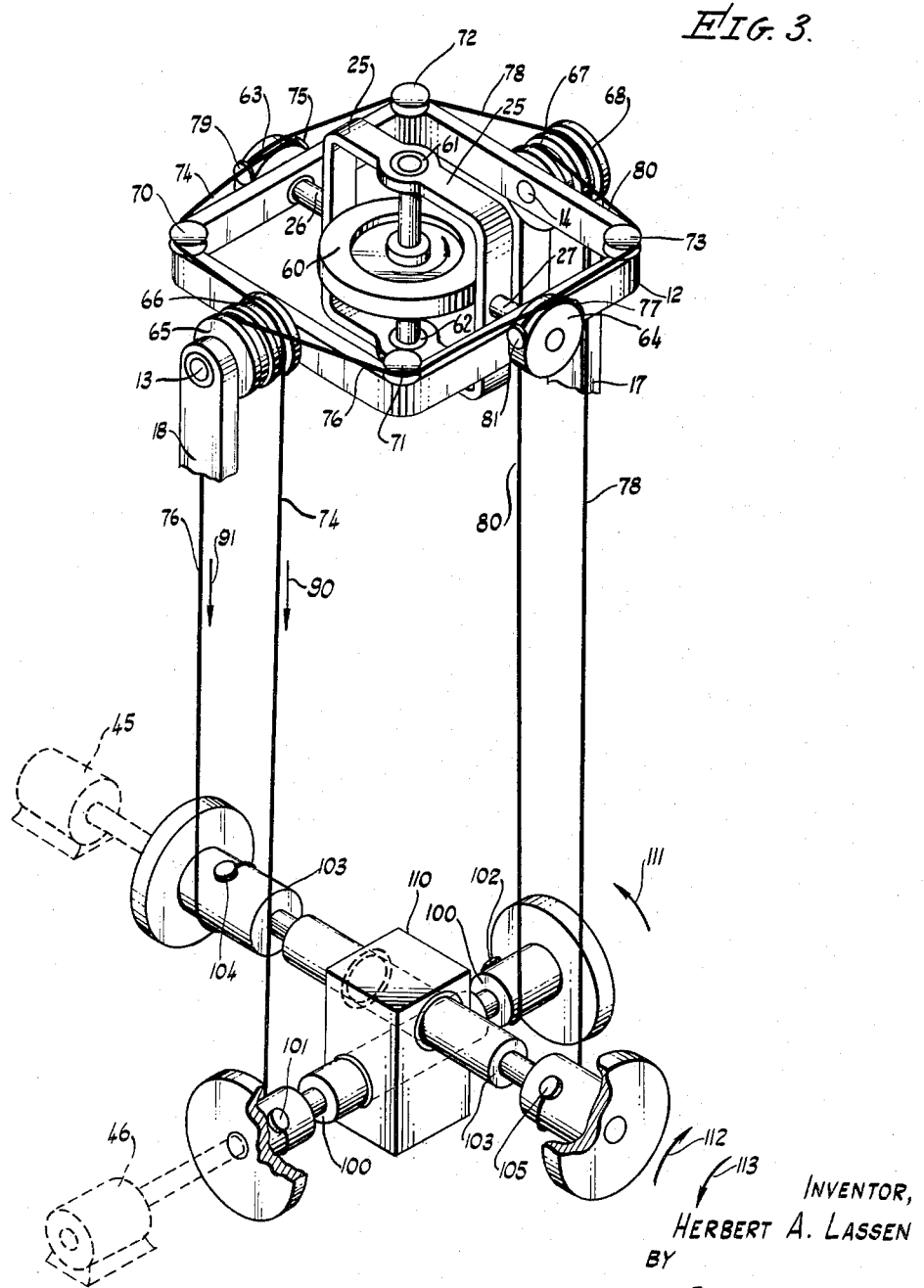

These and other objects of the present invention are more clearly defined in the appended claims. The invention itself, however, both as to its organization and method of operation, as well as additional advantages and objects thereof, will be more clearly understood from the following description when read in conjunction with the accompanying drawings wherein like elements bear the reference numeral and in which, FIG. 1 is a schematic representation illustrating the construction and operation of the torquing system of the present invention, FIG. 2 is one preferred embodiment of the torquing system illustrated in FIG. 1 adapted for use with a gyroscopic antenna system, with a portion of the system being cut away to more clearly teach the present invention, and FIG. 3 is another embodiment of the present invention illustrating a torquing system which utilizes flexible force transmitting members.

Figure 1:
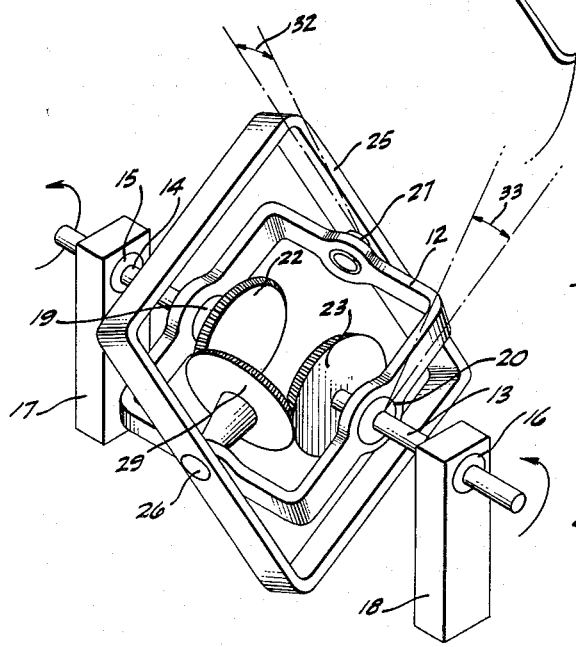

Referring now to the drawings, and more particularly to FIG. 1, an outer gimbal frame 12 is supported by first and second trunnions 13 and 14 which ride respectively in a pair of bearings 15 and 16. The outer bearings 15 and 16 may be attached to the carrying member of the gimbal system in any of a number of well known manners, and for purpose of illustration are shown as encased within a pair of supporting elements 17 and 18. The outer trunnions 13 and 14 support the outer gimbal frame 12 and are adapted to provide rotation of the outer gimbal frame 12 thereabout by means of a pair of trunnion bearings 19 and 20. Since the bearing systems illustrated in FIG. 1 are conventional in the art of gimbal structures they are illustrated schematically.

The outer trunnions 13 and 14 may be used for a dual purpose of supporting the outer gimbal frame and of providing the torque input shafts. In FIG. 1 they are illustrated as serving this dual function, and therefore they may be termed input shafts 13 and 14. Attached respectively to the ends of the shafts 13 and 14, are a pair of driving members shown for purpose of illustration as beveled pinion gears 22 and 23. It is, of course, to be understood that a gear arrangement is merely shown as one method of providing the required torque to the inner gimbal frame in accordance with the teachings of the present invention.

An inner gimbal frame 25 is supported by a second set of trunnions, 26 and 27, which are orthogonal to the first set of trunnions and are mounted within the outer gimbal frame 12 in a manner such that rotational movement of the inner gimbal frame 25 is permitted with respect to the outer gimbal frame 12. It is to be noted that although the inner gimbal frame 25 is physically placed about the outer gimbal frame 12, it is termed the inner gimbal frame since it is the member which is adapted to carry the object which is required to have two degrees of freedom. It is evident, of course, that the inner gimbal frame 25 can easily be mounted within the outer gimbal frame 12.

Attached to one end of the trunnion 26, which passes through the outer gimbal frame 12 and which is illustrated as being rigidly attached to the inner gimbal frame 25 to prevent relative movement therebetween, is a third driving element shown for purpose of illustration as a third beveled gear or spider gear 29 which is adapted to engage the first and second beveled pinion gears 22 and 23. It is thus seen that the three beveled gears form a differential arrangement in which the first and second beveled pinion gears 22 and 23 may be described as driving gears or pinion gears, and the third beveled gear 29 may be termed a spider gear. Although the trunnion 26 is shown as being rigidly attached to the inner gimbal frame 25, it is to be understood that any other type of coupling could be used which would convey torque from the third gear 29 to the inner gimbal frame 25.

As set forth above, the first and second trunnions 13 and 14 are adapted to rotate within the outer gimbal frame 12 by means of the bearings 19 and 20, and therefore serve as the rotary input shafts for the torque required to position the inner gimbal frame 25. It is, of course, to be understood that a different set of trunnions could be utilized for supporting the outer gimbal frame 12 which would then require a separate set of torque input shafts which would lie along and be parallel to the outer trunnions and adapted to rotate independent of the outer gimbal frame 12.

Assuming a non-gyroscopic body is mounted upon the inner gimbal frame 25, when a torque is applied to each of the input shafts 13 and 14, with the torques being equal in magnitude and in the same direction, there is no relative movement between the pinion gears 22 and 23, and the spider gear 29. Hence the azimuth angle 32 of the inner gimbal frame 25 remains unchanged. The input torques will, however, cause a translation of the ring gear 29, the inner gimbal frame 25, and the outer gimbal frame 12 in a manner such that the entire system rotates about the outer trunnions 13 and 14 causing a change in the elevation angle 33.

If the torque applied to the two input shafts is of unequal magnitude, or in the opposite direction, the spider gear 29 is rotated, and thus the inner gimbal frame 25 which is rigidly attached thereto is rotated about the second set of trunnions 26 and 27. This changes the azimuth angle 32. It is thus seen that by proper control of the input torques applied to the input shafts 13 and 14, the inner gimbal frame 25 may be rotated through 360° of elevation angle and through an angle which approaches 180° in azimuth, or any combination of the two.

If a gyroscopic mass is supported by the inner gimbal frame 25, means must be provided for applying the required precessional torque in a manner such that the torque is displaced 90° from the desired direction of precession. The torquing system of the present invention inherently accomplishes this in a manner which will be described in conjunction with FIG. 2 wherein a preferred embodiment of the present invention is illustrated in conjunction with a gyroscopic antenna system.

Referring now to FIG. 2, those elements which correspond to similar parts in FIG. 1 bear the same reference numeral. In FIG. 2, however, the rotary input shafts 13 and 14 do not serve as the outer trunnions in the manner illustrated in FIG. 1. Instead, a different pair of trunnions are adapted to support the outer gimbal frame 12 and permit rotation of the outer gimbal frame 12 thereabout. One of these outer trunnions, 13′, is shown. The other would be diametrically disposed to the outer trunnion 13′, but for clarity in the drawing it is not shown. The input shafts 13 and 14 are adapted to rotate within the outer trunnions to provide the necessary torque to the driving gears 22 and 23. In FIG. 2 the firt gimbal frame 12 has a generally spherical shape and is mounted within the second gimbal frame 25 which is also spherical. The gimbal frame 25 is partially broken away to expose the gear system.

An antenna system 40 which includes a dish or reflector 41, only part of which is shown, is adapted to be rotated by a driving motor 42 by means of a driving shaft 43 which passes between the differential gear arrangement. Thus, as the antenna system 40 rotates about the axle 43 at a high angular velocity, it behaves as a gyroscopic mass. It is, of course, to be understood that the antenna system and driving arrangement therefor are shown only for purposes of illustrating a gyroscopic system which could take any one of a number of different forms. In some cases it would be found desirable to utilize a driving shaft which would lie outside of the differential gear arrangement.

When the torquing system of the present invention is utilized with a gyroscopic mass, as illustrated in FIG. 2, torque-sensitive driving mechanisms, illustrated as the driving motors 45 and 46, are adapted to provide the necessary torque to the rotary input shafts 13 and 14. To this end, a pair of gear arrangements 47 and 48, together with the coupling shafts 49 and 50, serve to mechanically interconnect the rotary input shafts 13 and 14 with the driving motors 45 and 46. With regard to the term "torque-sensitive" used to describe the driving motors 45 and 46, it is meant that the motors are adapted to provide a selective output torque which is constant, irrespective of angular position of the shafts 49 and 50.

When the dish or reflector 41 is rotating in a direction indicated by the arrow 44 the elevation angle is changed in the following manner. A torque is applied by the motor 46 to the rotary input shaft 13 in a direction such that the input shaft 13 attempts to rotate in a counterclockwise direction as viewed from its right-hand end. A torque of equal magnitude is applied by the other torquing motor 45 to the second input shaft 14 in a direction such that the input shaft 14 attempts to rotate in a counterclockwise direction as viewed from its left-hand or outer end. Thus, the spider gear 29 is supplied with a torque which tends to rotate it in a counterclockwise direction as viewed from above. Due to the gyroscopic action of the rotating antenna system, however, the axis of rotation tends to precess in an upward direction and thereby change the elevation angle. It is evident that for such direction of precession a reaction will be created upon the driving gears 22 and 23 which tends to rotate them in the direction opposite to that caused by the applied torque. Since the driving motors 45 and 46 are torque-sensitive, they will maintain the applied torque at a fixed magnitude, irrespective of the angular position of the driving shafts. Thus, the driving shaft 13 rotates in a clockwise direction as viewed from its outer end and the shaft 14 rotates in a counterclockwise direction as viewed from its outer end as a result of the gyroscopic action of the rotating antenna system. The torque applied to each shaft, however, remains constant. Hence, the axis of the rotation of the gyroscopic system is precessed in an upwardly direction and the elevation angle is changed.

The azimuth angle of the antenna system 40 is changed when the torque applied to the rotary input shafts 13 and 14 is in such a direction that the torques applied to the ring gear 29 tend to translate the ring gear and prevent any rotation thereof. In this situation, the above-described reaction caused by the gyroscopic action of the antenna system causes one of the rotary input shafts 13 or 14 to rotate in a direction opposite to that which the torque applied by the driving motors 45 or 46 would tend to cause. The torque supplied by each of the motors, however, would remain constant. In this way the ring gear 29 rotates and the azimuth angle is changed.

From the above-described operation of the torquing system, it is evident that by proper control of the magnitude and direction of the torque supplied by the driving motors 45 and 46, any desired combination of elevation and azimuth angles may be achieved which lies within the limits permissible by the physical structure of the system.

To further illustrate the teachings of the present invention the embodiment illustrated in FIG. 3 is included which utilizes the basic principles taught in conjunction with FIG. 1. Thus in FIG. 3 the outer gimbal frame 12 is supported by the supporting elements 17 and 18 by means of the first set of trunnions 13 and 14 mounted within the bearing systems 15 and 16. It is to be noted in FIG. 3 that the outer gimbal frame 12 is mounted about the inner gimbal frame 25 whereas in FIG. 1 the inner gimbal frame 25 surrounds the outer gimbal frame 12. A gyroscopic mass 60 is rotatably supported by the inner gimbal frame 25 by means of a third bearing system including the bearings 61 and 62.

Attached to the trunnions 26 and 27 which support the inner gimbal frame 25 are first and second block members 63 and 64. The block members 63 and 64 are so coupled with the shaft or trunnions 26 and 27 that there can be no relative movement between the shafts and the block members.

A first set of cylindrical members which will be referred to as pulleys 65 and 66 are rotatably mounted or supported by the first trunnion 13 and are adapted to rotate independently of each other. A second set of cylindrical members or pulleys 67 and 68 are diametrically opposed to the first set and are rotatably mounted upon the second trunnion 14. Each of these pulleys may of course be rigidly attached to their respective trunnions, as will be evident from the description of operation of this embodiment. If they are thusly attached to the trunnions the friction of the flexible members thereon will be increased.

Mounted at each corner of the outer gimbal frame 12 are members which are adapted to support a cable and permit movement of the cable thereacross without hindering or interfering with the motion of the inner gimbal frame 28 as it rotates about the inner trunnions 26 and 27. Thus for purpose of illustration these cable supports are shown as corner pulleys 70, 71, 72, and 73 mounted on the four corners of the outer gimbal frame 12.

A first flexible member such as a cable 74 is attached to a first pin member 75 which is connected to the first block member 63. The first cable 74 passes around the first corner pulley 70 and over the pulley 66. A second cable 76 is attached to a second pin member 77 which is connected to the second block member 64. The second cable 76 passes around the second corner pulley 71 and over the pulley 65. A third cable 78 is attached to a third pin member 79 which is connected to the first block member 63 and diametrically opposed to the first pin member 75. The third cable 78 passes around the third corner pulley 72 and over the pulley 68. A fourth cable 80 is attached to a fourth pin member 81 which is diametrically opposed to the second pin 77 and also connected to the second block member 64. The fourth cable 80 passes around the fourth corner pulley 73 and over the pulley 67.

To describe the operation of the torquing system of FIG. 2, it will be assumed that a non-gyroscopic mass is mounted upon the inner gimbal frame. Thus when a downward force in the direction indicated by the arrow 90 is applied to the first cable 74 and a corresponding force of equal magnitude applied in a downward direction indicated by a second arrow 91 to the second cable 76 the forces will be transmitted to the first pin member 75, and the second pin member 77 in a manner which tends to rotate the inner gimbal frame 25 about the axis of the inner trunnions 26 and 27. If there is no restraining force the inner gimbal frame will rotate in a counterclockwise direction as viewed from the second block member 64. If the forces applied to the first and second cables are of equal magnitude it is seen that there will be no rotation of the outer gimbal frame 12. If the downward forces applied to the first and second cables 74 and 76 are instead applied to the second and third cables 78 and 80 the inner gimbal frame 25 will rotate about the inner trunnions 26 and 27 in a clockwise direction as viewed from the second block member 64.

If downward forces of equal magnitude are applied to the first and third cables 74 and 78 and no force applied to the other cables, it is seen that the forces are transmitted along the cable 74 and 78 to the first and third pins 75 and 79, causing the outer gimbal frame 12 to rotate about the outer trunnions 13 and 14. Thus the elevation angle of the system is changed. From the symmetry of the system it is seen that if downward forces of equal magnitude are applied only to the second and fourth cables 76 and 80 that the forces are transmitted to the second block member 64 in a manner such that the outer gimbal frame 12 rotates in the opposite direction about the outer trunnions. By applying forces to the cables in the proper manner it is thus evident that the inner gimbal frame can be made to assume a given position.

It is seen from the above description of the torquing system illustrated in FIG. 3 that by the proper control of forces applied to the four cables the inner gimbal frame 25 can be made to assume various positions in space. It is to be noted that in FIG. 3 the pins attached to the block members are substantially diametrically opposed and positioned in a manner which illustrates most clearly the method of operation, and are not necessarily the most advantageous true positions of the pins upon the block members. It is also to be noted that the outer gimbal frame could easily be positioned within the inner gimbal frame without impairing the operation of the system.

To apply the necessary force to the cables in a manner analogous to that described above the assembly illustrated below the gimbal system may be used. Since these force applying devices or torquers may assume a wide variety of physical shapes it is to be expressly understood that the type illustrated in FIG. 3 is included by way of example only.

The first cable 74 is attached to a first shaft 100 by means of a first pin 101 and the fourth cable 80 is likewise attached to the first shaft 100 by a second pin 102. It is to be noted that the cables 74 and 80 are attached to the shaft 100 in a manner such that if the shaft is rotated clockwise as viewed from the lefthand end that the amount of the cable 80 wound upon the shaft 100 increases and the amount of the cable 74 wound on the shaft 100 decreases. The second cable 76 is attached to a second shaft 103 by means of a third pin 104 and the third cable 78 is attached to the second shaft 103 by a fourth pin 105. The second and third cables are so attached to the shaft 103 that a clockwise rotation of the second shaft 103 as viewed from the righthand end increases the amount of the cable 78 which is wound upon the shaft 103 and decrease the amount of the cable 76 wound thereon.

A shaft support 110 is illustrated as having the shafts 100 and 103 rotatably mounted therein. It is of course possible to utilize four individual shafts coupled with the cables in a manner analogous to that illustrated in FIG. 3. That is, the member for applying force to the first cable 74 is so related to the member for applying force to the fourth cable 80 that if the amount of force applied to the first cable increases the amount of force applied to the fourth cable 80 decreases. This same relationship applies to the devices for providing force to the second and third cables 76 and 78. To maintain the shafts at a predetermined space from the gimbal system and thereby provide the necessary constant force in each of the cables, the shaft support 110 may be rigidly attached to the supporting elements 17 and 18. This of course could be accomplished in any of a number of well known manners and therefore the support elements 17 and 18 are illustrated as being broken off and not attached to the shaft support.

It is evident of course that many systems could be used to provide the desired forces to the four cables in the relationship as described above. The particular system of FIG. 3 is shown only because it illustrates in a simple manner the relationship of the forces applied to the cables. It is also to be noted that in FIG. 3 the shafts 100 and 103 are respectively parallel to the outer trunnions 13 and 14 and the inner trunnions 25 and 26. Therefore the second and third cables 76 and 78 do not lie in the plane which contains the inner trunnions and the shaft 103. In practice it may therefore be found advantageous to pass the second and third cables about a pulley system in a manner such that the downward force applied to the cables will not cause any lateral force upon the pulleys 65 and 68.

From the above description it is thus seen that if the first shaft 100 is rotated in a clockwise direction indicated by the arrow 111, and the second shaft 103 is rotated in a clockwise direction indicated by the arrow 112, that the first and third cables 74 and 78 are provided with a downward force, a portion of each cable rotates about the axis defined by the outer trunnions 13 and 14, and the outer gimbal frame 12 will rotate about the outer trunnions. If the first shaft 100 is rotated in a clockwise direction as indicated by the arrow 111 and the second shaft 103 is rotated in a counterclockwise direction as indicated by the arrow 113 the first and second cables will be provided with downward forces. If these forces are of equal magnitude there can of course be no rotation of the outer gimbal frame 12 since the first cable 74 would be attempting to rotate the outer gimbal frame 12 in one direction and the second cable 76 attempting to rotate the outer gimbal frame 12 in an opposite direction. However each cable is so coupled with the inner trunnions by means of the pins 75 and 77 that each is attempting to rotate the inner gimbal frame about the inner trunnions. Since there is no opposing downward force applied to the third and fourth cables 78 and 80 to counteract this rotation of the inner gimbal frame, a section of each of the cables 74 and 76 rotates about the trunnion 13 and the inner gimbal frame rotates about the inner trunnions 26 and 27.

It is to be noted that the embodiment of the present invention which is illustrated in FIG. 3 operates in a manner analogous to the embodiment illustrated in FIGS. 1 and 2. Thus in FIG. 1 if there is a difference in the torque applied to the first and second driving members 22 and 23 and hence relative movement therebetween the inner gimbal 25 rotates about the inner trunnions 26 and 27. If the same amount of torque is applied to each of the clutch members 22 and 23 and hence no relative movement between the two members the inner gimbal frame 25 and also the outer gimbal frame 12 rotates about the outer trunnions 13 and 14. Likewise in FIG. 3 if there is a difference in the downward forces applied to the first and third cables 74 and 78 and hence relative movement therebetween the inner gimbal frame 25 rotates about the inner trunnions 26 and 27. If the amount of downward force applied to the first and third cables 74 and 78 is of equal magnitude there is no relative movement between the first and third cables and therefore the inner gimbal frame 25 together with the outer gimbal frame 12 rotates about the outer trunnions 12 and 13. From the symmetry of the system it is seen that this also holds true for the second and fourth cables 76 and 80. Thus in the embodiment illustrated in FIG. 3 it is possible to position the inner gimbal frame and change both its azimuth and elevation angle utilizing a clutch system which requires only one fixed axis, namely that of the outer trunnions. It is of course evident that although 4 cables are shown in FIG. 3 that only two would be required if a force-bias arrangement such as a spring were coupled with the gimbal frames.

It is thus seen from the above description that by properly controlling the amount of force applied to the cables that the gimbal frame and hence a gyroscopic mass supported thereby can be made to assume various positions in space. If a pair of torque sensitive motors such as those illustrated in FIG. 2 as the elements 45 and 46 are respectively coupled with the shafts 100 and 103 in FIG. 3 it is seen that the system of FIG. 3 operates in a manner analogous to that of FIG. 1. Thus if a gyroscopic mass such as that illustrated in FIG. 3 is mounted within the inner gimbal frame 25 the inner gimbal frame will be able to precess in a direction which is 90° out of phase with respect to the applied torque.

There has thus been disclosed a torquing or positioning system for orienting an object which is mounted upon a two degree of freedom gimbal system and which is adapted to maximize the look angle or angular positions of the object. In addition, the torquing system of the present invention inherently provides for applying precessional torques to a gyroscopic mass mounted upon a two degree of freedom gimbal structure utilizing inputs which lie along parallel axes and which, therefore, increases the look angle of the gyroscopic mass.

What is claimed is:

1. A torquing system comprising in combination, a first trunnion defining a first axis, a first gimbal frame supported by said trunnion and in torque exchange relationship with said trunnion, a second gimbal frame rotatably coupled with said first trunnion, second and third trunnions rotatably supporting said second frame and defining a second axis orthogonal to said first axis, first and second driving members adapted to rotate about said second axis, means for selectively applying force to said driving members, force transmitting means connected between said driving elements and said first trunnion, said driving members and said force transmitting means being adapted to rotate said first frame about one of said axes when the force applied to each of said driving members is equal and to rotate said frame about the other of said axes when the force applied to each of said driving members is not equal.

2. A torquing system comprising in combination, a first gimbal frame, a first shaft connected in torque transmitting relationship with said frame, a second gimbal frame, means interconnecting said shaft and said second frame to permit rotation of said second frame with respect to said first frame, second and third shafts defining an axis orthogonal to said first shaft and rotatably supporting said second frame, first and second driving members adapted to rotate about said axis and be independently driven, and torque transmitting means interconnecting said first shaft and each of said driving members, whereby said first frame may be positioned by the application of force to said driving members.

3. A torquing system comprising in combination, a first gimbal frame, a first shaft defining a first axis and connected in torque exchange relationship with said frame, a second gimbal frame, means interconnecting said shaft and said second frame for permitting rotation of said second frame with respect to said first frame, second and third shafts rotatably supporting said second frame and defining a second axis orthogonal to said first axis, a first driving member coupled with said second shaft and adapted to rotate about said second axis, a second driving member coupled with said third shaft and adapted to rotate about said second axis, means adapted to apply force to each of said driving members in a predetermined manner, and torque transmitting means connected to said first shaft and to each of said driving members adapted to rotate said first frame about said first axis when the force applied to said first driving member is different from the force applied to said second driving member and to rotate said first frame about said second axis when the force applied to said first driving member is equal to the force applied to said second driving member.

4. In combination with a gimbal structure which includes first and second gimbal frames adapted to provide an object supported by the second frame with two degrees of freedom, a torquing system which comprises, first and second driving members lying within said first frame, first and second driving shafts lying in the same plane and respectively coupled with said first and second driving members for aplying torque thereto, a third driving member coupled with said first and second members and forming a differential drive therewith, and means interconnecting said third member with said second gimbal frame in torque exchange relationship, whereby the object mounted upon the second frame may be positioned by the aplication of torque to said shafts.

5. A positioning system comprising in combination, a first gimbal frame, first and second trunnions coupled with said frame and adapted to permit rotation of said frame thereabout, a second gimbal frame, a second set of trunnions orthogonal to said first set and rotatably interconnecting said frames, first and second driving shafts parallel to said first and second trunnions and adapted to rotate independently of said first frame, first and second driving elements respectively coupled to said first and second shafts and adapted to be driven by said shafts, a third driving element coupled with first and second elements to form a differential arrangement therewith, and means interconnecting said third element with said second frame for transmitting torque therebetween to position said frame in response to the torque applied to said shafts.

6. A positioning system comprising in combination, a first trunnion, a first gimbal frame rotatably supported thereby, a second trunnion disposed at right angles to said first trunnion and rotatably supported by said frame, a second gimbal frame attached to said second trunnion, a first gear coupled with said second trunnion, second and third gears coupled with said first gear and forming a differential driving arrangement therewith, and means for applying torque to said second and third gears in a predetermined manner to position said frame.

7. A positioning system comprising in combination, a first trunnion, a first gimbal frame rotatably mounted thereon, a second trunnion orthogonal to said first trunnion and rotatably supported by said frame, a second gimbal frame coupled with said second trunnion, a first gear connected to said second trunnion for transmitting force thereto, second and third gears coupled with said first gear in a differential driving arrangement, first and second rotary input shafts respectively coupled with said second and third gears and adapted to rotate independently of said first frame, and first and second torque sensitive driving elements respectively coupled with said first and second shafts for applying torque thereto.

8. A positioning system comprising in combination, first and second trunnions, a first gimbal frame rotatably supported thereby, a second gimbal frame rotatably coupled with said first frame, first and second shafts adapted to rotate independently of said first frame, a third shaft coupled in torque transmitting relationship with said second frame, first and second driving gears respectively connected to said first and second shafts, and a third driving gear connected to said third shaft and forming a differential driving arrangement with said first and said second gears, whereby the position of said second frame is controlled by the appliaction of torque to said first and second shafts.

9. A positioning system comprising in combination, first and second parallel driving shafts adapted to be independently driven, a first gimbal frame supported by said shafts, first and second driving gears respectively connected to said first and second shafts, a third shaft rotatably supported by said frame and orthogonal to said first and second shafts, a third gear connected to said third shaft and coupled in torque transmitting relationship with said first and second gears to form a differential driving arrangement therewith, and a second gimbal frame coupled in torque transmitting relationship with said third shaft, whereby said second frame is positioned by torque applied to said first and second shafts.

10. A positioning system comprising in combination, first and second driving shafts having parallel longitudinal axes, a first gimbal frame coupled with said shafts and adapted to rotate about said axes, a first gear connected to said first shaft, a second gear connected to said second shaft, a third shaft having a longitudinal axis perpendicular to the axes of said first and second shafts and rotatably supported by said first frame, a third gear connected to said third shaft and coupled with said first and second gears to provide a differential driving arrangement therewith, a second gimbal frame connected to said third shaft, and first and second torque sensitive driving motors coupled respectively with said first and second shafts for independently applying torque to said shafts, thereby to position said second gimbal frame.

11. A positioning system comprising in combination, first and second trunnions having parallel axes, a first gimbal frame supported by said trunnions and adapted to rotate about said axes, first and second driving shafts disposed parallel to said axes and adapted to rotate independently of said frame, a first gear connected to said first shaft, a second gear connected to said second shaft, a third shaft having an axis perpendicular to the axes of said trunnions and rotatably supported by said frame, a third gear connected to said third shaft and forming a differential driving unit with said first and second gears, a second gimbal frame connected to said third shaft, and first and second torque sensitive driving units respectively coupled with said first and second shafts for independently applying torque of predetermined magnitude to said shafts to selectively position said second gimbal frame.

References Cited in the file of this patent

UNITED STATES PATENTS

| | | |
|---|---|---|
| 1,545,812 | Chessin | July 14, 1925 |
| 1,787,930 | Fletcher | Jan. 6, 1931 |
| 2,008,058 | Boykow | July 16, 1935 |
| 2,302,894 | Ross | Nov. 24, 1942 |
| 2,383,409 | Newell | Aug. 21, 1945 |
| 2,797,374 | Atton et al. | June 25, 1957 |